US006554056B1

(12) United States Patent
Gustafson

(10) Patent No.: US 6,554,056 B1
(45) Date of Patent: Apr. 29, 2003

(54) METHOD OF MODIFYING PATTERNED SAND MOLDING ELEMENTS THROUGH MACHINING FOR PRODUCING PROTOTYPE METAL CASTINGS

(76) Inventor: Ronald L. Gustafson, 2503 Harlem Blvd., Rockford, IL (US) 61103

( * ) Notice: Subject to any disclaimer, the term of this patent is extended or adjusted under 35 U.S.C. 154(b) by 0 days.

(21) Appl. No.: 10/025,246

(22) Filed: Dec. 18, 2001

(51) Int. Cl.[7] ............................. B22C 9/00; B22C 9/10; B22C 9/18
(52) U.S. Cl. ........................................ 164/456; 164/137
(58) Field of Search .................................. 164/456, 137

(56) References Cited

U.S. PATENT DOCUMENTS

| | | |
|---|---|---|
| 3,101,516 A | 8/1963 | Hokkeling |
| 3,387,645 A | 6/1968 | Van Beckhoven |
| 4,104,347 A | 8/1978 | Ohashi et al. |
| 6,286,581 B1 | 9/2001 | Gustafson |

FOREIGN PATENT DOCUMENTS

| | | | |
|---|---|---|---|
| DE | 3824388 | | 1/1990 |
| DE | 43 22 083 | * | 1/1995 |
| DE | 43 22 085 | * | 1/1995 |
| DE | 198 25 448 | * | 12/1999 |
| JP | 52-22807 | | 6/1977 |
| JP | 54-66326 | | 5/1979 |
| JP | 59-166350 | | 9/1984 |
| JP | 61-172650 | | 8/1986 |
| RU | 899237 | | 1/1982 |

OTHER PUBLICATIONS

Newscast website pages (printed Sep. 8, 1999)(3 pages).
Brochure entitled *Clinkenbeard, Rapid Solutions To Today's Manufacturing Challenges*, undated.
Article entitled *Rapid Prototyping: A Tool for Casting Design and Certification* published in Modern Casting, Mar. 1999 (4 pages).

* cited by examiner

*Primary Examiner*—Kuang Y. Lin
(74) *Attorney, Agent, or Firm*—Leydig, Voit & Mayer, Ltd.

(57) ABSTRACT

A method of forming prototype metal castings by forming and modifying one or more sand mold elements of a sand mold assembly. The method includes molding and patterning sand into shapes of the sand mold elements and then forming a first metal casting by filling the internal cavity of the first sand mold assembly with molten metal material. The first metal casting is evaluated for strength or other desirable characteristics. Once a defect is noted the sand mold elements are modified by machining sand away from at least one of the sand mold elements of a later formed sand mold assembly to modify the shape of the internal cavity between mold elements. Machining modifications are determined from evaluating the first metal casting. Then a modified metal casting is made by filling the modified internal cavity of the modified sand mold assembly with molten metal material.

11 Claims, 5 Drawing Sheets

METHOD OF MODIFYING PATTERNED SAND MOLDING ELEMENTS THROUGH MACHINING FOR PRODUCING PROTOTYPE METAL CASTINGS

FIELD OF THE INVENTION

The present invention generally relates to metal casting foundry operations, and more particularly, to methods for forming sand cores, sand molds or other molding elements for use in metal casting foundry operations.

BACKGROUND OF THE INVENTION

Sand molds typically comprise upper and lower shells (often referred to as a cope and a drag) which provide a hollow internal compartment therebetween to form the external shape of a simple metal casting. Frequently it is desired that the metal casting contains an internal cavity, such as a fluid passageway for example. Anyone can see at a glance that a metal casting cavity contains nothing. As such, special forms known as sand cores are used to shape the interior design of a metal casting. The core, thus, merely defines the shape during molten metal filling by preventing the flowing metal from occupying this space. After the mold has solidified, the core is destroyed at shakeout, leaving only the correctly shaped casting cavity. The sand mold including the cope and the drag, as well as internal cores can be generally characterized as molding elements.

A foundryman can also use a core to shape the external part of the more intricate casting. For instance, if a section of the casting is an undercut, a core can be used for section, so that the pattern can be withdrawn from the mold without distorting the mold. Besides forming internal cavities surrounded by metal, or some external surfaces of an intricate casting, a core is sometimes used to strengthen or improve a particular inner or outer surface of the mold.

Some of the typical requirements of molding elements are that they are workable in moldings and have sufficient bench life, that they are able to vent off gases during molten metal pouring and cooling operations, and that they are able to have good collapsibility such that the sand shakes out well once the metal is cooled to expose the metal casting and any internal cavities in the metal casting. As such, copes, drags and cores are typically made of dry, free-flowing sand. Special binders are added to the sand to hold the sand together in the desired shape, and generally give the individual molding element its name. For example, the following types of sand/binder materials have been used for molding elements in metal casting foundry processes: green sand, hot box, oil bonded, furan (no bake), shell, cold box, sodium silicate $CO^2$, and others.

In high volume production, foundrymen form the separate sand-shaped cores by compacting a special sand mixture in a core box. The core box is a specially designed structure, the cavity of which is shaped like the core to be made. Copes and drags are typically made in a special machine that includes a matchplate that occupies the internal hollow compartment between the cope and the drag while the mold is being formed.

While the above-described method for making molding elements works very well for high volume production, it has several drawbacks with regards to making single prototypes or low volume production of metal castings where turn around time is absolutely critical. Manufacturers who use metal castings are in constant competition to see who can get a new product to the marketplace the quickest. Manufacturers which have their new product to the marketplace first can gain a significant commercial advantage.

Manufacturers often make their decision on where to out source a cast metal prototype component based on the quoted turn around time. Conventional methods of casting production, including the construction of tooling and the pouring a casting, are often too time-exhaustive to provide a metal model to a company for verification of the component's shape and its fit in the overall end product design. As such some manufacturers do not even create actual metal castings but simply rely on various other rapid prototyping methods that have evolved for design verification before a casting is poured. Rapid prototyping methods can make the process of "printless" tooling and casting quotation easier and more accurate. For example, various rapid prototyping processes such as Fused Deposition Modeling (FDM), Laminated Object Manufacturing (LOM), Selective Laser Sintering (SLS), Solid Ground Curing (SGC), Stereolithography (SLA), Three dimensional Printing (3DP), Direct Shell Production Casting (DSPC), have been used to create prototypes. However, these methods are still more time consuming than desired or have practicality limitations. Moreover, many of these methods only produce wax, plastic or paper/woodlike prototypes, which are insufficient for most laboratory testing. Even machining a metal prototype will yield a prototype with different precision qualities and strength qualities as compared with a cast metal prototype.

Despite the recent advances in computer-based simulations of casting solidification, many manufacturers still require prototypes of metal castings to be tested before approval is given for mass production. Moreover, actual metal castings are usually desired in any event due to the extreme costs of making changes after a design is released for production or even into the marketplace. For the foundry and the manufacturer, the verification of a cast metal component before full production is vital to reducing lead times and total costs. For example, the costs of changing the basic design of a product increase rapidly as the design advances through the development cycle. The development cycle can generally be categorized in the following five (5) steps, including: conceptual modeling, detailed design, prototype/test, manufacturing, and product release. Making changes during the conceptual modeling stage is by far the cheapest, while changes at the product release stage are by far the most expensive. It has been estimated that the cost of making changes increases tenfold for each different step during the process. For example, if a change was to be made during conceptual modeling which costs one dollar, the same change made during the prototype/test stage would be a hundred dollars, and at the manufacturing time, one thousand dollars, and at the product release stage, ten thousand dollars. Therefore, the quicker a prototype can be made for use in testing or verification, the more changes a manufacturer can make to a metal casting before it is manufactured or released into the marketplace.

The problem is that the production of hard tooling (such as metal dies for die casting, permanent molding, and investment wax for injection, or cope/drag tooling to which the long sand casting production runs) often do not meet the manufacturer's desired lead time requirements, for example, a shipment of a hundred prototype castings for use in three (3) weeks. Even with these advances in rapid prototyping processes, manufacturers are still not satisfied with the requisite time it takes to obtain a cast metal prototype for use in testing, or a test market. The common method to form these metal casting prototypes is to use one of the rapid prototype patterns (for example a woodlike prototype made by the LOM process) that is durable enough to survive the sand molding process and can be used directly as a master pattern to make sand mold elements. Rapid prototype core boxes can be used to make the cores that are filled with sand manually, rather than with a core blower.

Currently, there is not a quick enough turnaround time in industry with regards to making prototype metal castings. Moreover, precision can be lost in the making of sand molds from plastic, wax or woodlike prototypes and core boxes formed by from a wood-like, plastic or wax prototype or other appropriate prototype made via a rapid prototyping process. Moreover, the sand can settle or change shape after being formed in the core box and allowed to cure, which also slightly changes the shape of the core box and results in less precession. This also is likewise undesirable.

Further, if the prototype does not work as expected or has other flaws resulting from the process, the master patterns (e.g. the pattern plates for copes and drag elements or the core boxes) may be rendered worthless despite thousands of dollars and time invested in creating the master patterns in the first place.

BRIEF SUMMARY OF THE INVENTION

It is therefore an object of the present invention to overcome these and other disadvantages and problems existing out there in the art.

It is a specific object of the present invention to provide faster methods for forming prototype or low volume metal castings to provide quicker turn around times for prototype or low volume metal castings.

It is another object of the present invention to provide a faster way to form sand mold elements such as a cope, a drag, a core, or other such sand pattern type items for use in foundry molds to produce prototype or low volume metal castings.

It is a further object of the present invention to avoid the inefficiencies involved with having worthless master patterns such as core boxes or pattern plates due to a design flaw discovered after production of the master patterns.

In accordance with these and other objectives, the present invention is directed toward a method of forming prototype metal castings by forming and modifying one or more sand mold elements of a sand mold assembly. The method includes molding and patterning sand into shapes of the sand mold elements and then forming a first metal casting by filling the internal cavity of the first sand mold assembly with molten metal material. The first metal casting is evaluated for strength or other desirable characteristics. Once a defect is noted, the sand mold elements are modified by machining sand away from at least one of the sand mold elements of a later formed sand mold assembly to modify the shape of the internal cavity between mold elements. Machining modifications are determined from evaluating the first metal casting. Then a modified metal casting is made by filling the modified internal cavity of the modified sand mold assembly with molten metal material.

It is an advantage that new master patterns (e.g. core boxes or matchplates) need not be formed and that many prototypes can be more inexpensively made and more quickly made by simply modifying the sand mold elements formed by existing but flawed master patterns. With complex patterns, only a small portion(s) of the sand mold element may necessitate changes, and therefore, the machining operation may be very quick without substantial wear experienced on the machining tools or machinist operator time. This invention is applicable to both prototype patterns and production patterns. For example, if design flaws are discovered at a very late stage after production tools have been made, said mold elements can be taken directly from the production line, can be machined and modified, then new castings can then be poured and tested.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

Figure 1:
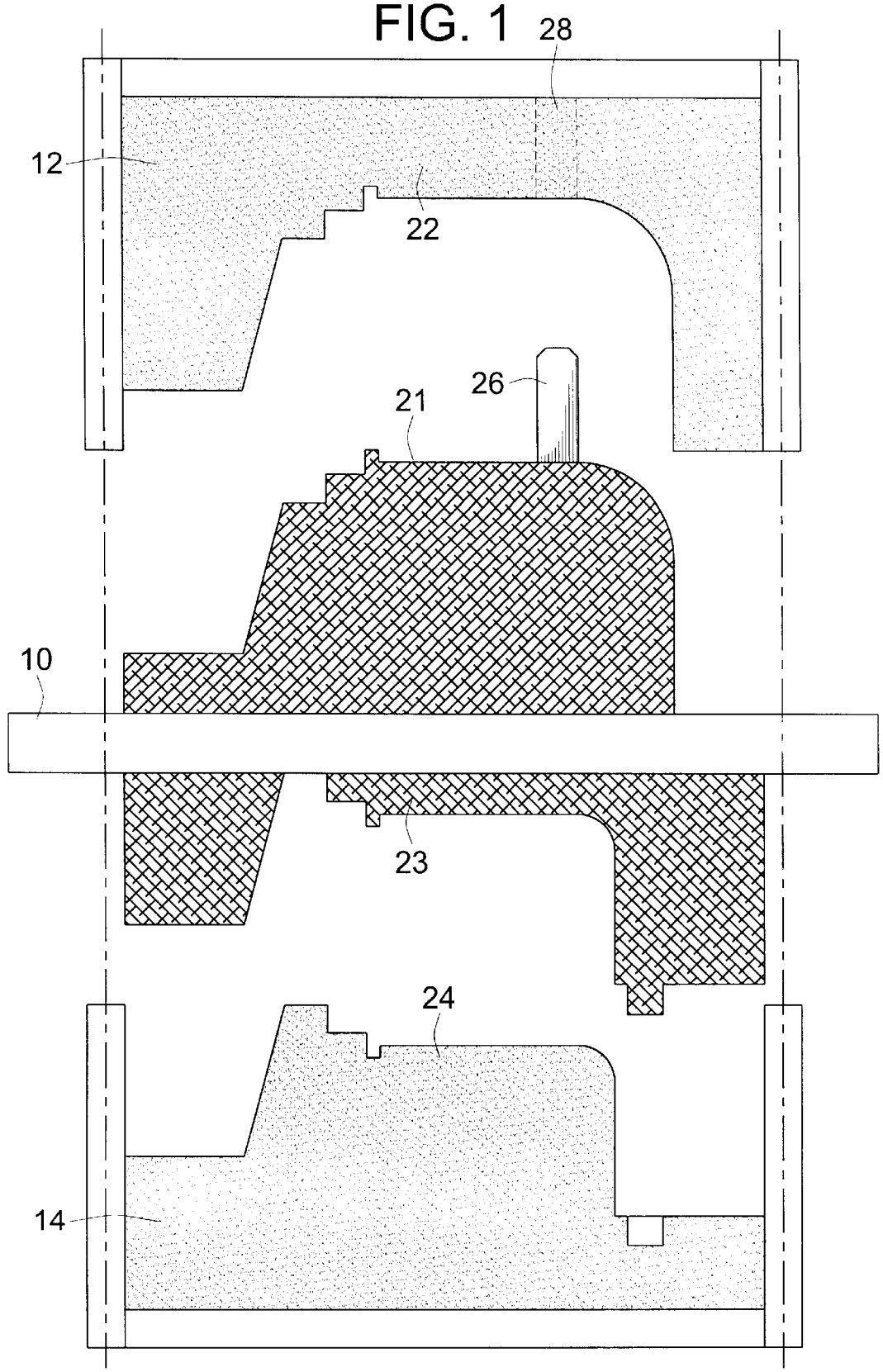
FIG. 1 is an exploded cross section view of a pattern plate and mold making assembly for forming the cope and drag of a sand mold.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The present invention is directed toward a method of machining a patterned sand mold element to modify metal castings produced thereby. Accordingly, FIGS. 1–5 are provided to illustrate the steps which may be conducted according to an embodiment of the present invention.

When making a large number of prototype metal castings (e.g. 100 metal castings) for evaluation verification, test marketing or experimental testing, typically, master patterns are made according to one or more methods described in the background. These master patterns typically comprise a pattern plate 10 for making the cope mold 12 and the drag mold 14, and one or more core boxes 16 for forming a sand core 18. These master patterns can be used to create sufficient numbers of prototype metal castings to satisfy a company's verification need.

To form the cope and drag molds 12, 14, formable sand mixed with wet binder material is packed over the top and bottom sides of the pattern plate 10. The top side of the pattern plate 10 typically has a predetermined pattern 21 that forms a cavity 22 into the upper cope mold 12. Similarly, the bottom side of the pattern plate typically has predetermined pattern 23 that forms a complementary cavity 24 into the lower drag mold 14. The pattern plate 10 also typically includes a sprue former 26 that is adapted to form a pouring sprue 28 in the cope mold 12. The pouring sprue 28 provides an inlet for molten metal to be poured into the complementary cavities 22, 24 of the cope and drag molds 12, 14. Once the sand is packed around the pattern plate 10, the binder material is allowed to harden or cure, thereby hardening and rigidifying the cope and drag molds 12, 14. An internal cavity 29 connected to the sprue 28 is then left between the cope and drag molds 12, 14.

To form the sand core 18, formable sand mixed with wet binder material is packed between upper and lower sections 30, 32 of the core box 16. The core box sections 30,.32 define a cavity 34 which forms the outer peripheral surface of the sand core 18. The sand core 18 is then allowed to harden.

Figure 2:
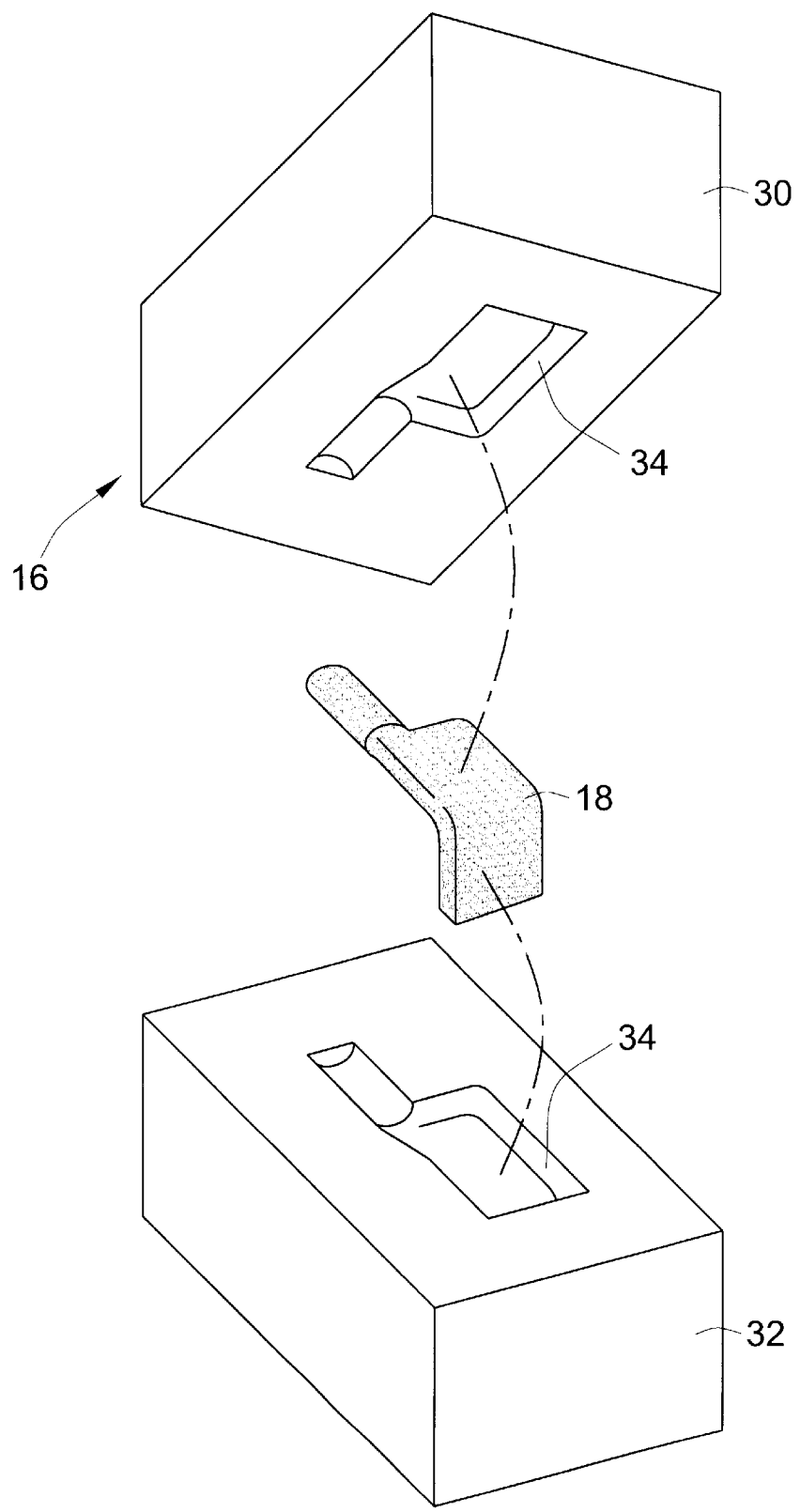
FIG. 2 is an exploded isometric view of a core box assembly for forming a sand core that is adapted to fit between the cop and the drag of FIG. 1 to partly fill the cavity formed thereby.
Figure 3:
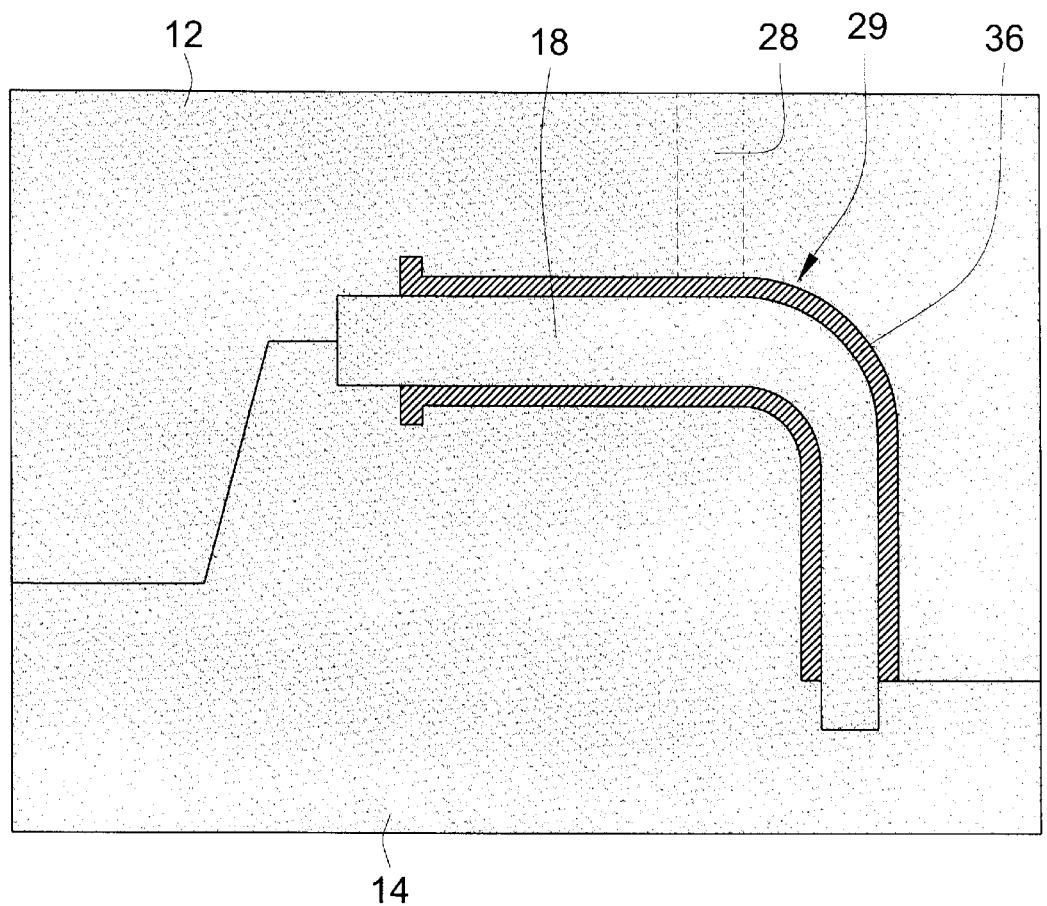
FIG. 3 is a cross section of the sand mold elements formed in FIGS. 1–2 arranged in interfitting relation and a unmodified metal casting that is adapted to be formed among the sand mold elements.

Once the sand mold elements are formed as illustrated in FIGS. 1 and 2, the sand mold elements are arranged together with the sand core 18 placed into the internal cavity 29 between the cope and drag molds 12, 14 as shown in FIG. 3. The sand core 18 thus partly fills the internal cavity 29. Once the sand mold elements are arranged together, molten metal is poured into the sand mold and allowed to harden forming the prototype metal casting 36 as is also shown in FIG. 3. Sand is broken and shaken away to release and expose the prototype metal casting 36 from the sand mold. The prototype metal casting 36 has an outer periphery that generally matches the surfaces of the complementary cavities 22, 24 of the cope and drag molds and an internal cavity (e.g. such as a flow passage) formed by the sand core 18.

The prototype metal casting 36 is then often subjected to evaluation verification, and/or testing. At this point, a lot of time and money has been invested in making the master patterns for producing the sand core 18, the cope mold 12, and the drag mold 14. As such, it is desired that no design flaw be discovered at this point. However, it is inevitable that design flaws sometimes occur and are discovered upon evaluation of the metal casting 36 or upon initial experimental testing of the metal casting 3,6. For example, one problem that sometimes occurs at this point is strength failure of the prototype metal casting 36 when the actual forces, shock loads, etc. are applied.

Figure 4:
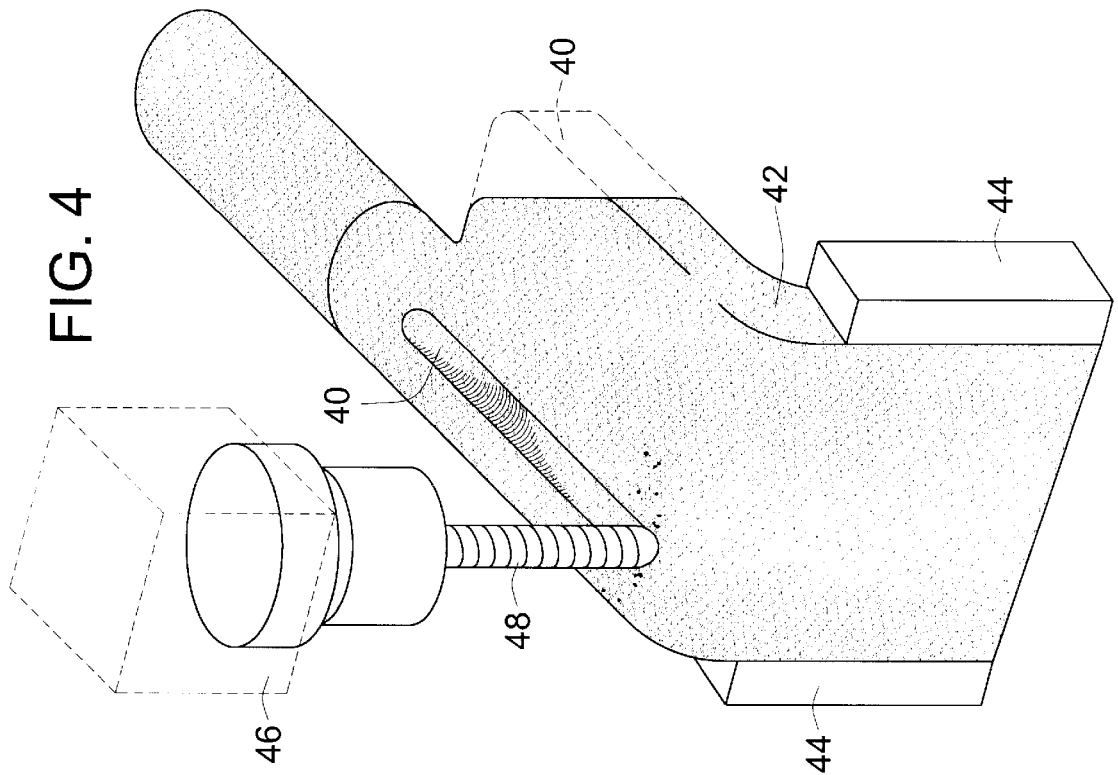
FIG. 4 is an isometric view of a machining operation that has been performed on the sand core formed in FIG. 1 to modify the sand core.

Rather than simply waste some or all of the time and money invested in producing the master patterns (e.g. the core box 16 and/or pattern plate 10) and produce new prototype patterns, the disclosed embodiment of the present invention remedies such design flaws by modifying one or more of the sand mold elements through a subsequent machining operation, as shown in FIG. 4. FIG. 4 illustrates the sand core being machined at two different locations which removes sand material. The machining operation results in a modified sand core 50 that has a first patterned portion 38 formed via normal patterning, and a second machined portion 40 formed via machining (that includes a channel and a cut off corner indicated in dotted lines in FIG. 4). The modified sand core 42 is of a different characteristic and with less sand than the unmodified sand core 18 illustrated in FIG. 2. However, the modified sand core 42 still interfits between the cope mold 12 and the drag mold 14 and has structures that are supported by the cope mold 12 and the drag mold 14. It will be appreciated that the drag mold 14 or the cope mold 12 may also be machined to remove sand material in addition or in alternative to the sand core 18.

The way to accomplish machining of an already patterned sand mold element may be conducted in a similar manner as non-molded or non-patterned sand blocks for forming sand cores as disclosed U.S. patent application Ser. No. 09/920, 359 filed Aug. 1, 2001 and U.S. Pat. No. 6,286,581. As such, the entire disclosures of these patent references are hereby incorporated by reference in their entireties. Suffice to say herein, that the sand core (or other mold.element) is clamped into a fixed position via a clamp 44 or otherwise held for work operations by a machine tool 46 having a work tool 48 that is adapted to machine away sand material. If necessary, the sand core may be repositioned to accomplish removal of material across different faces of the sand core or to machine along different axes. Preferably, the work tool 48 is made of carbide or diamond for longer life although steel tools may also be used.

Figure 5:
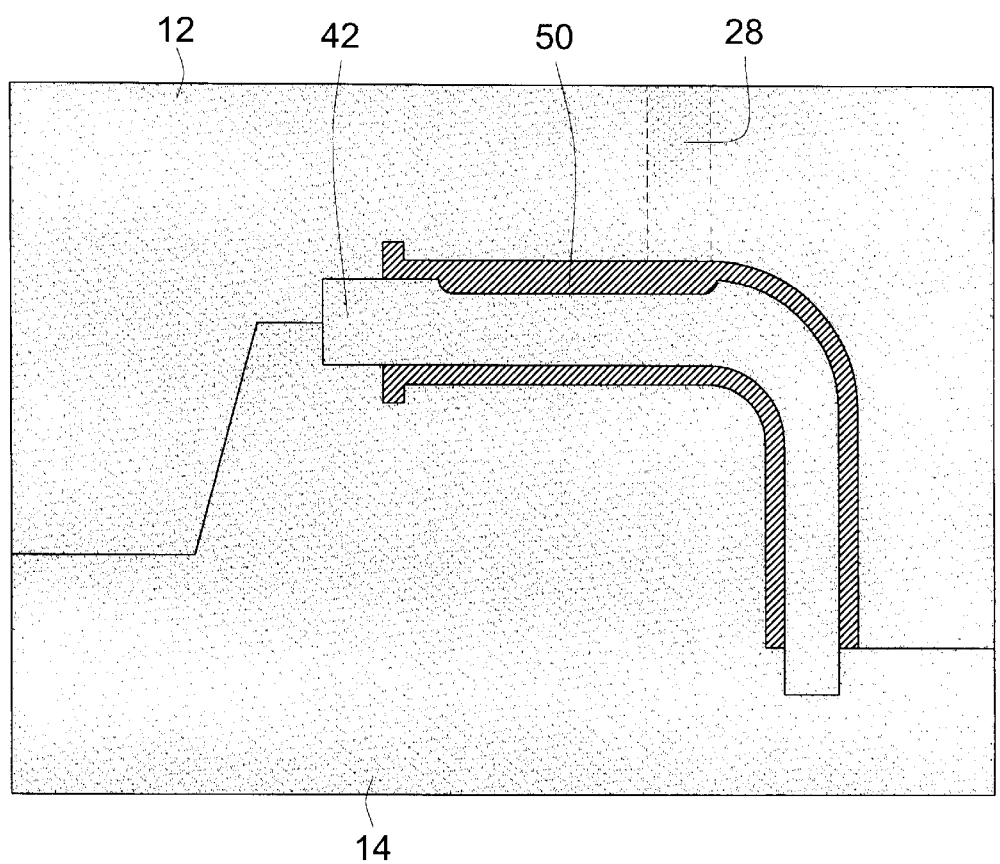
FIG. 5 is a cross section of the cope and drag formed in FIG. 1 along with the modified partly machined sand core of FIG. 4 with a modified metal casting that is adapted to be formed among these sand mold elements as modified.

The machined portion(s) 40 are selected based upon design flaws or strength failures resulting from experimental testing. In particular, the removal of additional sand in the modified sand core 42 in turn increases the amount of metal resulting in a modified metal casting 50 as shown in FIG. 5. The modified metal casting 50 of FIG. 5 has a different characteristic as compared with the metal casing 36 of FIG. 3 formed without the machining operation. In the illustrated embodiment, the added metal reinforces selected areas in the modified metal casting 50 making it stronger to avoid the design flaws discovered after the master patterns had been created. The machining operation may be used to create for example reinforcing gussets, extra support ribs, or other desirable structure or feature where additional metal material is desired. The machining operation may also be used to form a cavity or groove for gluing in an additional sand core to modify the casting. This would add sand and thereby remove metal material in the resulting metal casting.

The modified metal casting 50 may then be subjected to experimental testing and evaluation. If the modified metal casting 50 performs as desired, production master patterns for high volume production may be then formed based on modified metal casting 50, thereby avoiding the design flaws experienced with the initial prototype metal castings 36. If the modified metal casting 50 still does not perform as desired, further machining operations may be done to sand mold elements until a desirable result is achieved.

All of the references cited herein, including patents, patent applications and publications are hereby incorporated in their entireties by reference. While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and the scope of the invention as defined by the following claims.

What is claimed is:

1. A method of forming and modifying one or more sand mold elements of a sand mold assembly, the sand mold assembly having an internal cavity adapted to be filled with molten material for forming a metal casting, the method comprising:

molding and patterning sand into shapes of the sand mold elements with at least one master pattern to provide a first mold assembly, the sand mold elements interfitting together to define the internal cavity;

forming a first metal casting with the first mold assembly;

determining that the first metal casting formed with the first mold assembly has a flaw;

selecting at least one area on the at least one sand mold element for a machining operation to remedy said flaw;

molding and patterning sand into shapes of the sand mold elements with at least one master pattern to provide a second mold assembly;

machining the at least one area of at least one of the sand mold elements of the second mold assembly to modify the shape of the internal cavity; and forming a second metal casting with the second mold assembly.

2. The method of claim 1 wherein said patterning step comprises patterning a cope and a drag with matchplates, wherein the sand mold element being machined is at least one of the cope and the drag.

3. The method of claim 1 wherein said patterning step includes patterning a sand core with a core box, wherein the sand mold element being machined comprises a sand core.

4. The method of claim 1 wherein said patterning is conducted while the sand is in a soft formable state, and wherein said machining is conducted while the sand is in a hardened state.

5. The method of claim 1 wherein the said mold elements are selected from the group comprising a cope, a drag and a sand core.

6. A method of forming prototype metal castings by forming and modifying one or more sand mold elements of a sand mold assembly, the sand mold assembly having an internal cavity adapted to be filled with molten material for forming a metal casting, the method comprising:

molding and patterning sand into shapes of the sand mold elements with at least one master pattern, the sand mold elements fitting together into a first sand mold assembly to define the internal cavity;

forming a first metal casting by filling the internal cavity of the first sand mold assembly with molten metal material and allowing the molten metal material harden;

evaluating the first metal casting;

patterning sand into shapes of the sand mold elements with at least one master pattern, the sand mold elements adapted to fit together into a second sand mold assembly to define the internal cavity;

machining at least one of the sand mold elements of the second sand mold assembly to modify the shape of the internal cavity based upon at least one change determined from evaluating the first metal casting; and forming a second metal casting by filling the modified internal cavity of the second sand mold assembly with molten metal material and allowing the molten metal material harden.

7. The method of claim 6 wherein said patterning step comprises patterning a cope and a drag with matchplates, wherein the sand mold element being machined is at least one of the cope and the drag.

8. The method of claim 6 wherein said patterning step includes patterning a sand core with a core box, wherein the sand mold element being machined comprises a sand core.

9. The method of claim 6 wherein said patterning is conducted while the sand is in a soft formable state, and wherein said machining is conducted while the sand is in a hardened state.

10. The method of claim 6 wherein the said mold elements are selected from the group comprising a cope, a drag and a sand core.

11. The method of claim 6 wherein said evaluating comprises testing the first metal casting for strength, and wherein said changes are determined based on areas of weakness on the first metal casting, said machining being conducted at selected areas on the sand mold elements to increase strength of the second metal casting.

* * * * *